(12) United States Patent
Vitale

(10) Patent No.: US 11,647,270 B2
(45) Date of Patent: May 9, 2023

(54) BAYONET CONNECTING AN OPTICAL SYSTEM WITH A SPLIT LENS TO AN IMAGE CAPTURE DEVICE

(71) Applicant: GoPro, Inc., San Mateo, CA (US)

(72) Inventor: Nicholas Vitale, Foster City, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/348,737

(22) Filed: Jun. 15, 2021

(65) Prior Publication Data
US 2022/0400196 A1 Dec. 15, 2022

(51) Int. Cl.
*H04N 5/225* (2006.01)
*G02B 7/14* (2021.01)
*G02B 7/02* (2021.01)
*G03B 17/14* (2021.01)

(52) U.S. Cl.
CPC ........... *H04N 5/2257* (2013.01); *G02B 7/021* (2013.01); *G02B 7/14* (2013.01); *H04N 5/2253* (2013.01); *H04N 5/2254* (2013.01); *G03B 17/14* (2013.01)

(58) Field of Classification Search
CPC ............... H04N 5/2251; H04N 5/2252; H04N 5/22521; H04N 5/22525; H04N 5/225251; H04N 5/2253; H04N 5/2254; H04N 5/2257; H04N 5/2258; H04N 1/00538; H04N 1/00541; H04N 5/23209; G03B 17/02; G03B 17/14; G03B 17/561; G03B 17/565; G03B 17/566; G03B 30/00; G03B 2217/00; G03B 2217/002; G02B 7/021; G02B 7/14; G02B 13/001–009; H04M 1/0264; H01L 27/14618; H05K 2201/10121
See application file for complete search history.

(56) References Cited

U.S. PATENT DOCUMENTS

| | | | |
|---|---|---|---|
| 10,701,249 B1 * | 6/2020 | Guo | H04N 5/22521 |
| 11,425,286 B2 * | 8/2022 | Vitale | H04N 5/22521 |
| 2002/0130963 A1 | 9/2002 | Gelbard | |
| 2010/0165188 A1 * | 7/2010 | Jannard | H04N 5/772 348/375 |
| 2013/0111464 A1 * | 5/2013 | Markas | G06F 9/44521 717/174 |
| 2013/0128104 A1 | 5/2013 | Laurens | |
| 2013/0129335 A1 | 5/2013 | Gainer | |
| 2013/0182179 A1 | 7/2013 | Page | |

(Continued)

FOREIGN PATENT DOCUMENTS

CN 216595712 U 5/2022

*Primary Examiner* — Twyler L Haskins
*Assistant Examiner* — Akshay Trehan
(74) *Attorney, Agent, or Firm* — Young Basile Hanlon & MacFarlane, P.C.

(57) ABSTRACT

The present teachings provide an image capture device including an optical system having a bayonet. The bayonet is connected to a body of the image capture device. The bayonet includes a forward surface, a rearward surface opposing the forward surface, and a bayonet axial surface; and. The optical system includes an integrated sensor and lens assembly (ISLA) extending away from the rearward surface of the bayonet; and a lens module extending away from the forward surface of the bayonet and comprising a lens module axial surface, wherein the lens module axial surface contacts the bayonet axial surface so that the lens module is axially aligned with the bayonet.

20 Claims, 10 Drawing Sheets

(56) References Cited

U.S. PATENT DOCUMENTS

| | | |
|---|---|---|
| 2013/0343735 A1 | 12/2013 | Zhang |
| 2014/0098225 A1 | 4/2014 | Rodriguez |
| 2014/0160304 A1* | 6/2014 | Galor ............... H04N 5/232933 |
| | | 348/207.1 |
| 2015/0293430 A1* | 10/2015 | O'Neill ................ G03B 17/566 |
| | | 396/544 |
| 2016/0174408 A1 | 6/2016 | Tolbert |
| 2016/0274338 A1 | 9/2016 | Davies |
| 2016/0349601 A1 | 12/2016 | Kungl |
| 2017/0062303 A1 | 3/2017 | Lee |
| 2017/0064159 A1 | 3/2017 | Lee |
| 2017/0102513 A1* | 4/2017 | Ogata ................ G02B 27/0018 |
| 2017/0223239 A1* | 8/2017 | Petty ................. H04N 5/22521 |
| 2018/0224717 A1 | 8/2018 | Matsuzawa |
| 2022/0353400 A1* | 11/2022 | Vitale .................. H04N 5/2253 |

* cited by examiner

BAYONET CONNECTING AN OPTICAL SYSTEM WITH A SPLIT LENS TO AN IMAGE CAPTURE DEVICE

TECHNICAL FIELD

This disclosure relates to an optical system having a split lens and specifically the optical system including an integrated sensor and lens assembly (ISLA) and a lens module that are spaced apart within an image capture device and components that align the ISLA and the lens module relative to one another.

BACKGROUND

Typical cameras include one or more lenses and one or more image sensors. The image sensor(s) is aligned with the lens(es) so that images may be taken through the lens(es). The image sensor(s) and the lens(es) are connected within an image capture device so that alignment of the image sensor(s) and the lens(es) is maintained. The image sensor(s) and the lens(es) may be connected to a frame or to each other so that alignment is achieved and maintained. These attachments may constrain a size and/or a shape of the image sensor(s), the lens(es), or both so that the components may be connected within a body of the image capture device. An image capture device may typically include a single fixed lens that is used for images and/or video capture. This single lens may allow for satisfactory images and videos in most situations; however, there may be instances where a different lens may be desirable.

SUMMARY

Disclosed herein are implementations of an image capture device including an optical system having a bayonet. The bayonet is connected to a body of the image capture device. The bayonet includes a forward surface, a rearward surface opposing the forward surface, and a bayonet axial surface; and. The optical system includes an integrated sensor and lens assembly (ISLA) extending away from the rearward surface of the bayonet; and a lens module extending away from the forward surface of the bayonet and comprising a lens module axial surface, wherein the lens module axial surface contacts the bayonet axial surface so that the lens module is axially aligned with the bayonet.

The implementations taught herein provide an image capture device including a bayonet, an integrated sensor and lens assembly (ISLA), and a modular lens. The bayonet is connected to a body of the image capture device. The bayonet includes a forward surface, a rearward surface opposing the forward surface, and a bayonet axial alignment surface (BAAS). The BAAS extends from the forward surface toward the rearward surface about an optical axis. The image capture device includes an optical system including the ISLA, and the modular lens. The integrated sensor and lens assembly (ISLA) includes an ISLA axial alignment surface (IAAS) configured to contact the BAAS to align the ISLA with the bayonet about the optical axis so that the ISLA extends away from the rearward surface of the bayonet. The modular lens extends along the optical axis in a direction away from the ISLA and toward the forward surface of the bayonet.

The implementations taught herein provide an image capture device including a bayonet, an optical system, and a modular lens. The bayonet is connected to a body of the image capture device. The bayonet includes a forward surface, a rearward surface, and a planar mating surface. The optical system includes an integrated sensor and lens assembly (ISLA) and a modular lens. The integrated sensor and lens assembly (ISLA) extends away from the rearward surface of the bayonet, wherein the ISLA includes a shoulder configured to contact the planar mating surface so that the bayonet and the ISLA maintain an axial spacing therebetween along an image axis that extends through the bayonet and the ISLA. The modular lens extending along the image axis in a direction from the rearward surface toward the forward surface of the bayonet.

The present disclosure provides an image capture device having an optical system. The optical system includes a lens module, bayonet, and an integrated sensor and lens assembly (ISLA). The bayonet is connected to a body of the image capture device. The bayonet includes a forward surface, and a rearward surface opposing the forward surface. The ISLA extends rearward away from the rearward surface of the bayonet. The modular lens extends forward away from the forward surface of the bayonet, and wherein the modular lens and the ISLA are decoupled so that the ISLA and the modular lens are free of direct contact.

The present disclosure provides an image capture device including a bayonet and an integrated sensor and lens assembly (ISLA). The bayonet connected to a body of the image capture device, wherein the bayonet comprises: a bayonet tab extending from a rearward surface of the bayonet. The ISLA comprises a slot located in a forward surface of the ISLA that is configured to receive all or a portion of the bayonet tab to form an installed position where the bayonet and the ISLA are rotationally aligned around an axis that extends through the ISLA and the bayonet.

The present disclosure provides an image capture device having a bayonet and an integrated sensor and lens assembly (ISLA). The bayonet includes a forward surface, a rearward surface, a central portion, a bayonet axial surface, a bayonet axial alignment surface (BAAS), and a planar mating surface. The rearward surface opposing the forward surface. The central portion extending between the forward surface and the rearward surface. The bayonet axial surface is located on an interior of the central portion. The BAAS is located between the rearward surface and the bayonet axial surface. The planar mating surface forms the rearward surface of the bayonet. The ISLA includes an ISLA axial alignment surface (IAAS), a retainer, a shoulder, a modular lens, a lens module, a lens assembly, a lens, a lens seal, an integrated sensor, and a bayonet seal. The ISLA includes a portion that extends rearward away from the rearward surface of the bayonet. The IAAS is configured to contact the BAAS to align the bayonet relative to the ISLA. The retainer is located adjacent to and spaced apart from the IAAS. The shoulder is located between the IAAS and the retainer, and the shoulder is configured to contact the planer mating surface in an installed position so that axial movement of the bayonet and ISLA relative to one another is prevented and the bayonet and ISLA are axially aligned along an optical axis. The modular lens extends forward away from the forward surface of the bayonet, and the modular lens and the ISLA are decoupled so that the ISLA and the modular lens are free of direct contact. The lens module has a lens module axial surface configured to contact the bayonet axial surface during installation or removal of the modular lens, the bayonet, or both so that the modular lens and the bayonet are aligned along the optical axis. The lens module is connected to the bayonet and located forward of the forward surface of the bayonet. The lens is connected to the lens module. The lens seal is located between the lens module and the lens. The integrated sensor is connected to a rear surface of the lens assembly. The bayonet seal located between the bayonet and the lens module.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The present teachings provide a device that includes a split lens (e.g., a two-part lens). The split lens is part of an optical system that is incorporated into an image capture device. The split lens may include one lens that is fixed within an image capture device (e.g., an integrated sensor and lens assembly (ISLA)) and one lens that is removable (e.g., a lens module including a modular lens) and changeable with another lens module. The ISLA includes an integrated sensor connected to a rear end of a lens assembly. The lens module extends in front of the lens assembly. The lens module, the modular lens, or both may be removed, replaced or changed, and then sealed or enclosed within the image capture device. The modular lens may be part of a lens module and the lens module may be removable and replaceable to change the type of modular lens used with the image capture device. The modular lens may be completely or partially sealed within the lens module.

In order for images or videos to be detected for capture, the modular lens and the ISLA are aligned along an optical axis. The ISLA and the modular lens may be subject to build tolerances that could cause misalignment and negatively impact detection and capture of image or video. However, the present teachings seek to provide an ISLA where alignment and seating between the ISLA and the modular lens are proper every time the modular lens is installed within the image capture device so that images or videos detected are clear and complete without distortion. Furthermore, it is desirable to maintain water resistance or waterproofing of an image capture device when the modular lens is installed within or removed from the image capture device. The present teachings provide an image capture device that provides precise alignment of the ISLA to the modular lens, the lens module, or both while maintaining a waterproof seal.

Figure 1A:
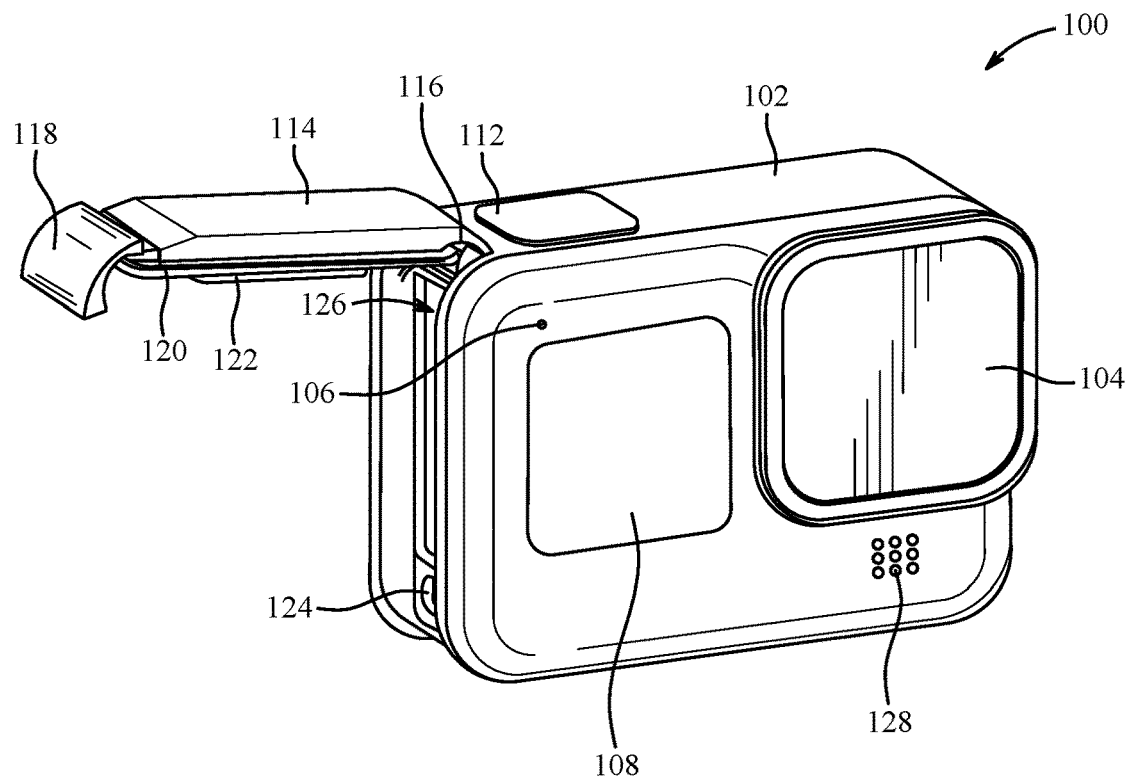
FIGS. 1A-1B are isometric views of an example of an image capture device.
Figure 1B:
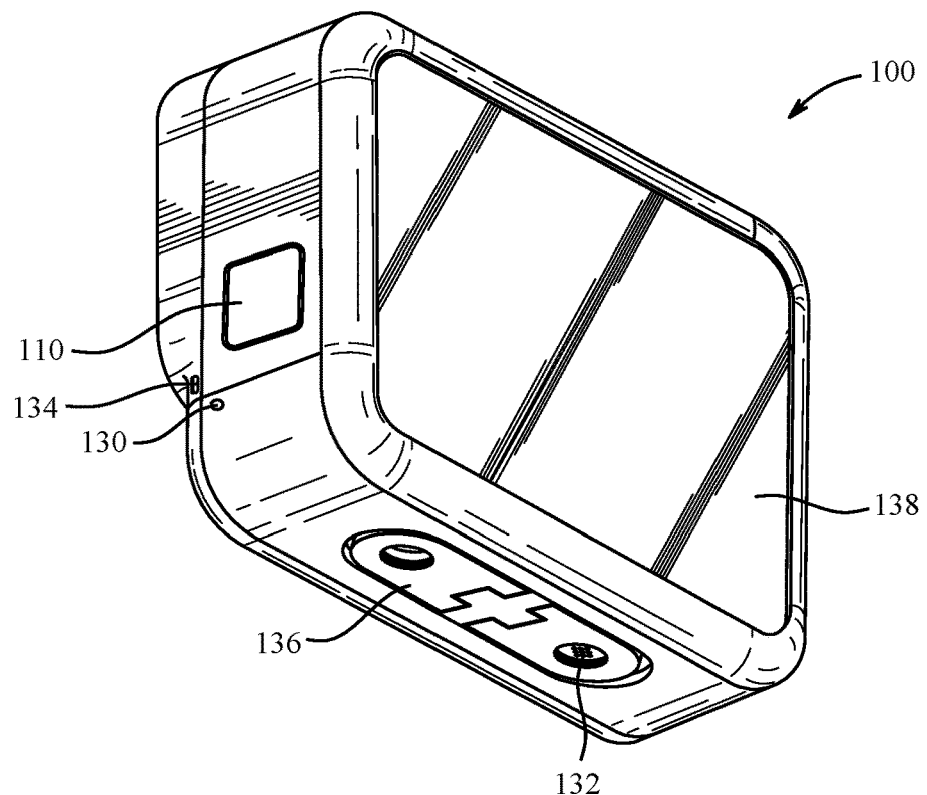

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
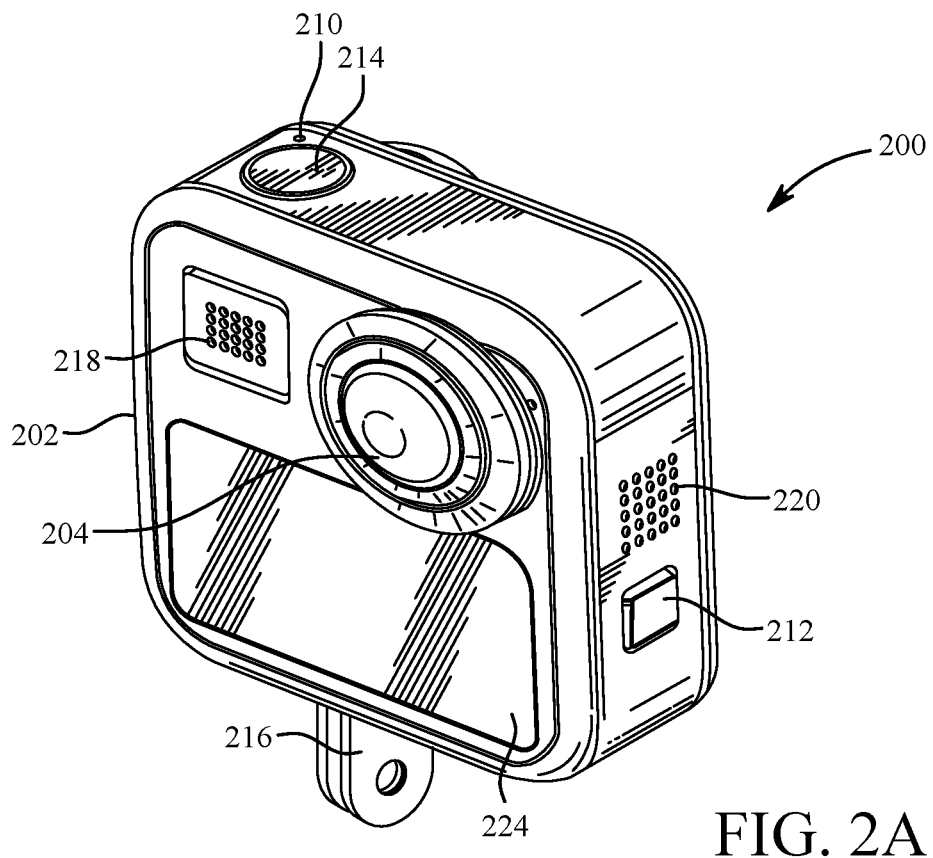
FIGS. 2A-2B are isometric views of another example of an image capture device.
Figure 2B:
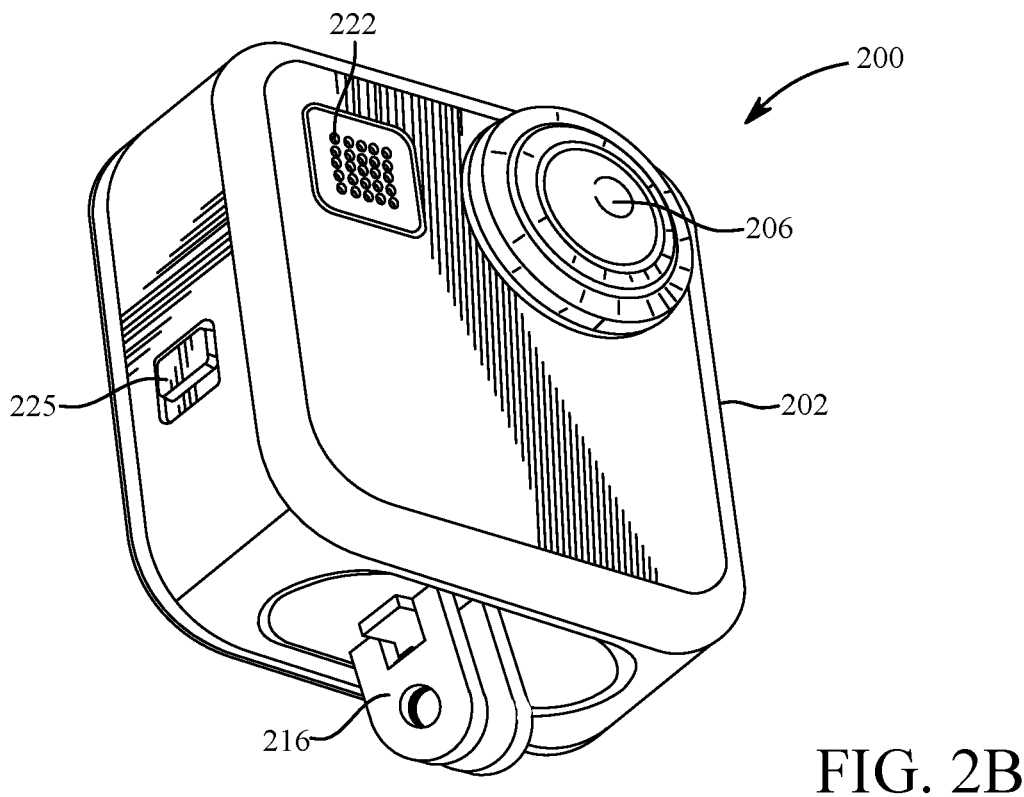

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 2C:
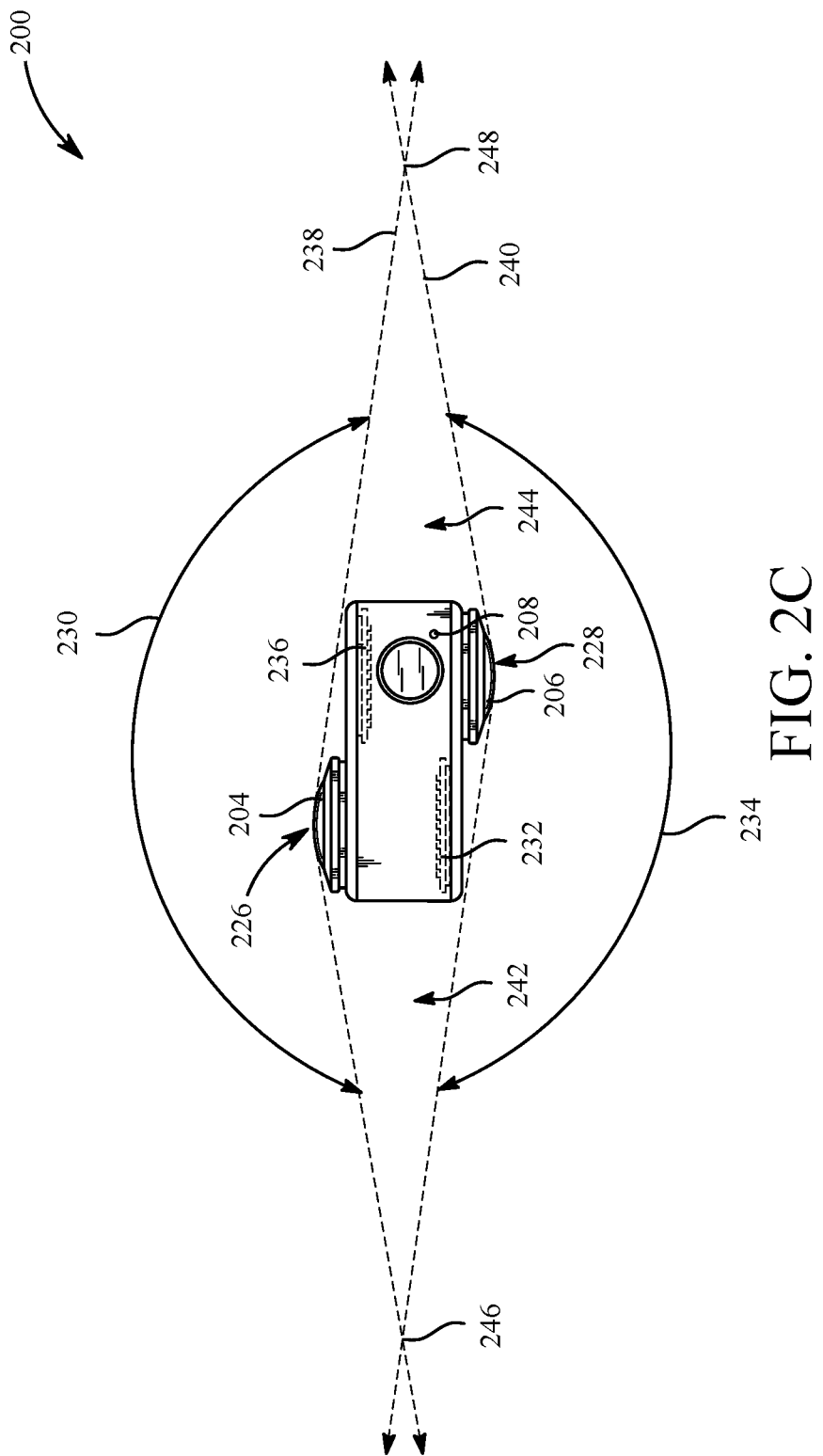
FIG. 2C is a top view of the image capture device of FIGS. 2A-B.
Figure 2D:
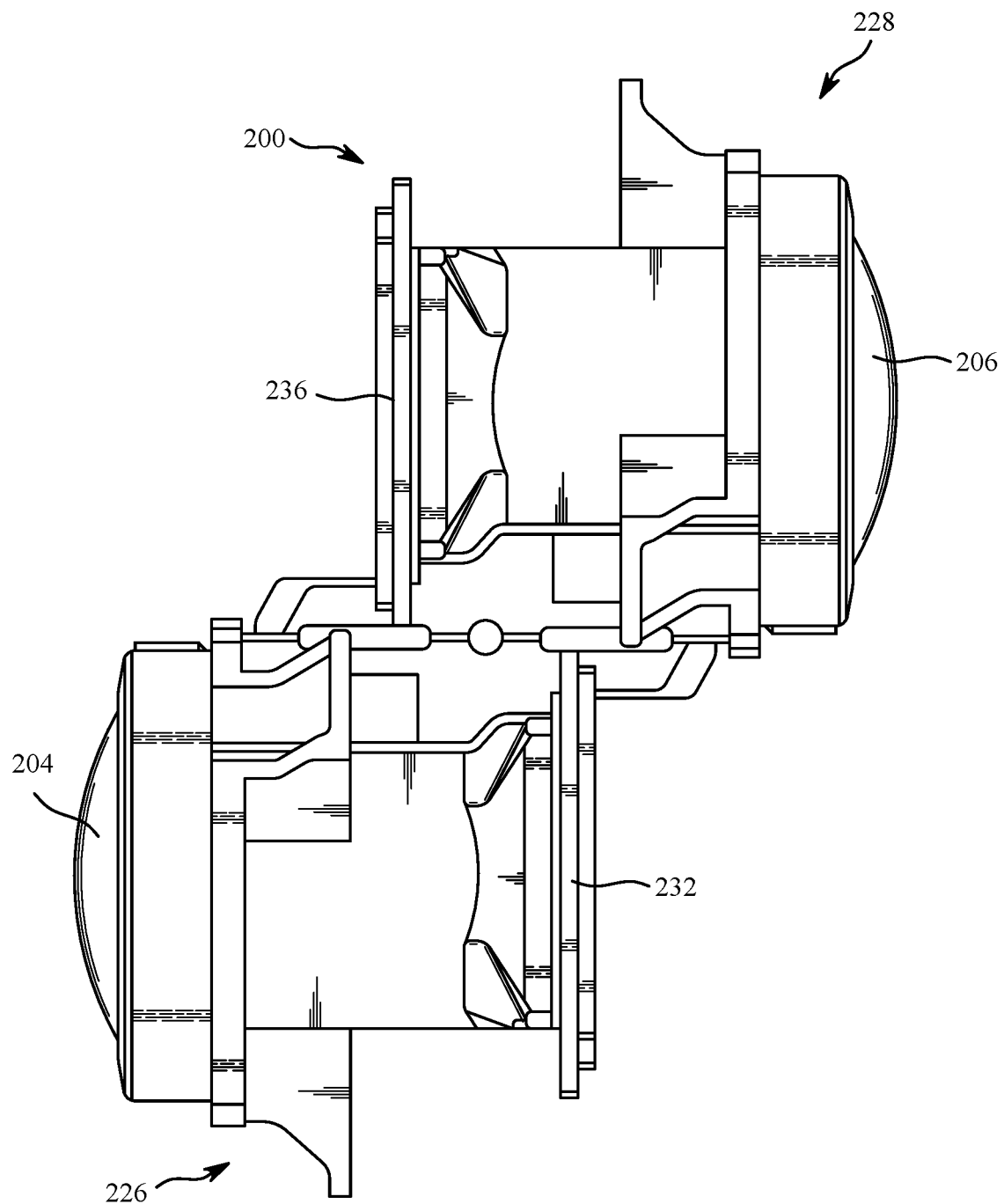
FIG. 2D is a partial cross-sectional view of the image capture device of FIG. 2C.

FIG. 2C is a top view of the image capture device 200 of FIGS. 2A-B and FIG. 2D is a partial cross-sectional view of the image capture device 200 of FIG. 2C. The image capture device 200 is configured to capture spherical images, and accordingly, includes a first image capture device 226 and a second image capture device 228. The first image capture device 226 defines a first field-of-view 230 and includes the lens 204 that receives and directs light onto a first image sensor 232. Similarly, the second image capture device 228 defines a second field-of-view 234 and includes the lens 206 that receives and directs light onto a second image sensor 236. To facilitate the capture of spherical images, the image capture devices 226 and 228 (and related components) may be arranged in a back-to-back (Janus) configuration such that the lenses 204, 206 face in generally opposite directions.

The fields-of-view 230, 234 of the lenses 204, 206 are shown above and below boundaries 238, 240 indicated in dotted line. Behind the first lens 204, the first image sensor 232 may capture a first hyper-hemispherical image plane from light entering the first lens 204, and behind the second lens 206, the second image sensor 236 may capture a second hyper-hemispherical image plane from light entering the second lens 206.

One or more areas, such as blind spots 242, 244 may be outside of the fields-of-view 230, 234 of the lenses 204, 206 so as to define a "dead zone." In the dead zone, light may be obscured from the lenses 204, 206 and the corresponding image sensors 232, 236, and content in the blind spots 242, 244 may be omitted from capture. In some implementations, the image capture devices 226, 228 may be configured to minimize the blind spots 242, 244.

The fields-of-view 230, 234 may overlap. Stitch points 246, 248 proximal to the image capture device 200, that is, locations at which the fields-of-view 230, 234 overlap, may be referred to herein as overlap points or stitch points. Content captured by the respective lenses 204, 206 that is distal to the stitch points 246, 248 may overlap.

Images contemporaneously captured by the respective image sensors 232, 236 may be combined to form a combined image. Generating a combined image may include correlating the overlapping regions captured by the respective image sensors 232, 236, aligning the captured fields-of-view 230, 234, and stitching the images together to form a cohesive combined image.

A slight change in the alignment, such as position and/or tilt, of the lenses 204, 206, the image sensors 232, 236, or both, may change the relative positions of their respective fields-of-view 230, 234 and the locations of the stitch points 246, 248. A change in alignment may affect the size of the blind spots 242, 244, which may include changing the size of the blind spots 242, 244 unequally.

Incomplete or inaccurate information indicating the alignment of the image capture devices 226, 228, such as the locations of the stitch points 246, 248, may decrease the accuracy, efficiency, or both of generating a combined image. In some implementations, the image capture device 200 may maintain information indicating the location and orientation of the lenses 204, 206 and the image sensors 232, 236 such that the fields-of-view 230, 234, the stitch points 246, 248, or both may be accurately determined; the maintained information may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back lens configuration. Reducing the lateral distance between the lenses 204, 206 may improve the overlap in the fields-of-view 230, 234. In another embodiment (not shown), the lenses 204, 206 may be aligned along a common imaging axis.

Images or frames captured by the image capture devices 226, 228 may be combined, merged, or stitched together to produce a combined image, such as a spherical or panoramic image, which may be an equirectangular planar image. In some implementations, generating a combined image may include use of techniques including noise reduction, tone mapping, white balancing, or other image correction. In some implementations, pixels along the stitch boundary may be matched accurately to minimize boundary discontinuities.

Figure 3:
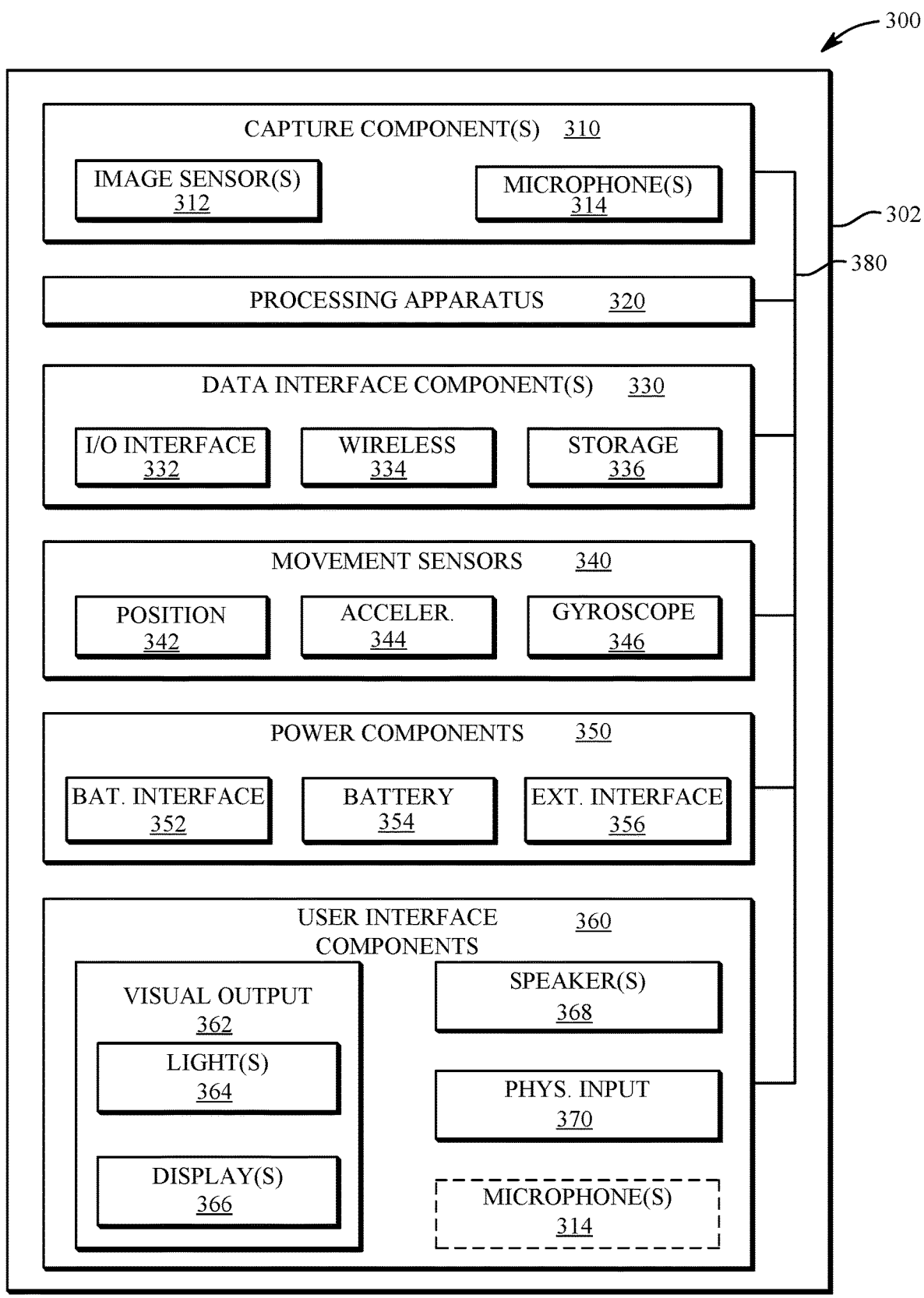
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands. The image capture device 300 may include one or more ISLAs that assist in taking and recording images and/or videos.

Figure 4:
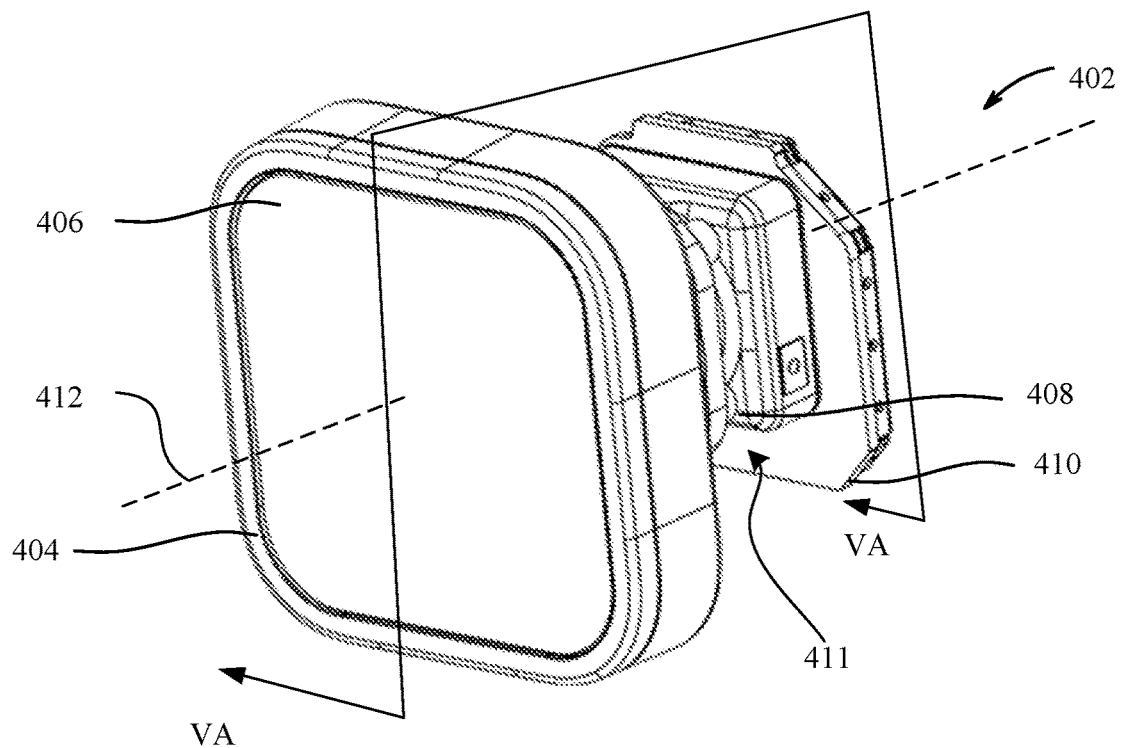
FIG. 4 is a perspective view of an optical system removed from an image capture device.

FIG. 4 is a front perspective view of an optical system 402 that can be used as part of the image capture devices 100, 200 of FIGS. 1A and 2A-2B. The optical system 402 is located within the image capture device so that the image capture device protects the optical system 402 while the optical system 402 is being used to detect and record images and/or videos. The optical system 402 includes a lens module 404 that has a lens 406, which extends in front of an integrated sensor and lens assembly (ISLA) 408. The ISLA 408 includes an integrated sensor 410 that is connected to and located behind a lens assembly 411. The integrated sensor 410 is aligned with the lens assembly 411 and the lens module 404 along an axis 412 so that images or videos may be detected and recorded by the optical system 402. The integrated sensor 410 may be or include any image sensor discussed herein that is capable of detecting an image, video, or both. The axis 412 may be a line of sight, an optical axis, a centerline through a field of view of the integrated sensor 410, or a combination thereof of the optical system 402. The axis 412 may extend substantially through a center of the lens module 404, the ISLA 408, the optical system 402, or a combination thereof so that images or videos along the axis 412 may be detected and recorded. The axis 412 may define a line of sight through the lens module 404 and the ISLA 408 along which images or videos may be detected and all of the components of the optical system 402 may be aligned along the axis 412.

The lens module 404 is removably connectable to a front of the image capture device such as the image capture devices 100, 200 of FIGS. 1A and 2A-2B to protect and seal the optical system 402 within the image capture device. The lens(es) 406 in the lens module 404 may be fixed or interchangeable with other lens(es) and lens modules. The lens(es) 406 may be changed by a user depending upon desires of the user. For example, the lens(es) 406 may be changed to a wide-angle lens, a telescoping lens, a filtered lens, a flat lens, a fisheye lens, a concave lens, a convex lens, a waterproof lens, an underwater lens, a magnifying lens, or a combination thereof. The lens(es) 406 may allow the image capture device to be adapted for multiple different needs of a user. The lens(es) 406 of the lens module 404 may be fixedly connected within the lens module 404 such that the entire lens module 404 is replaced when a lens change is desired. The lens(es) 406 may be an integrated part of the lens module 404 or may be removable from the lens module 404. The lens module 404 may be disconnected and reconnected to the image capture device. The lens module 404 is movable and is connectable to a forward surface of the image capture device (not shown) and assists in sealing the optical system 402 within the image capture device. The lens module 404 covers and protects a modular lens (not shown) and the ISLA 408.

The ISLA 408 of the optical system 402 may be free of a connection with the integrated sensor 410. The integrated sensor 410 may be connected directly to a frame of the image capture device or a heat sink of the image capture device. The integrated sensor 410 may be directly connected to the lens assembly 411. The integrated sensor 410 may be suspended from a rear surface of the lens assembly 411 so that the integrated sensor 410 and the lens assembly 411 are aligned relative to one another or form a single unit. The integrated sensor 410 and the lens assembly 411 are located along the axis 412 so that the integrated sensor 410 is axially aligned with an image sensor being oriented to detect images or videos through the lenses (not shown) of the lens assembly 411. The optical system 402 may have one or more or even two or more removable components that when replaced in the optical system 402 are all aligned along the axis 412.

Figure 5A:
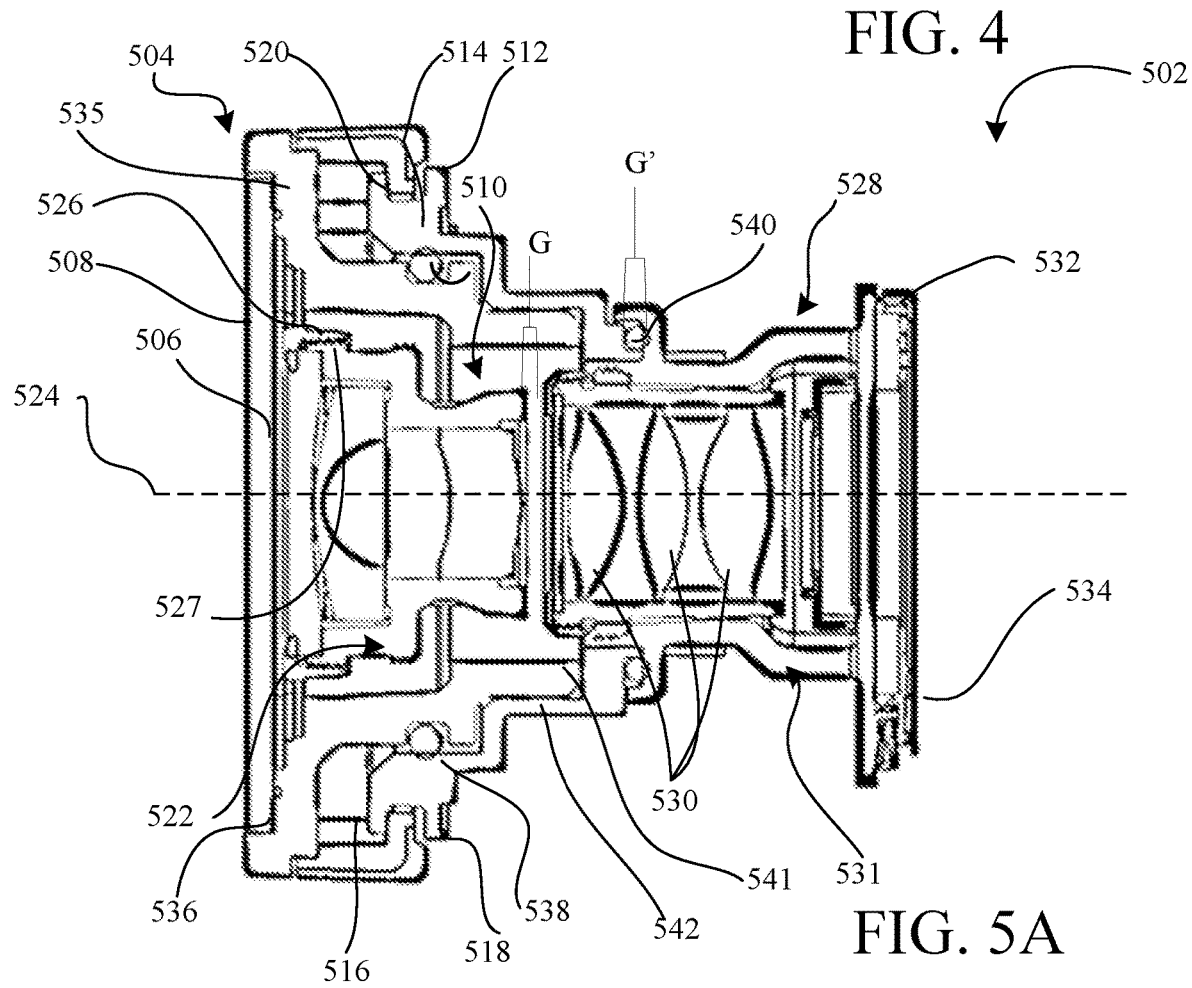
FIG. 5A is a cross-sectional view of the optical system of FIG. 4 along lines VA-VA.
Figure 5B:
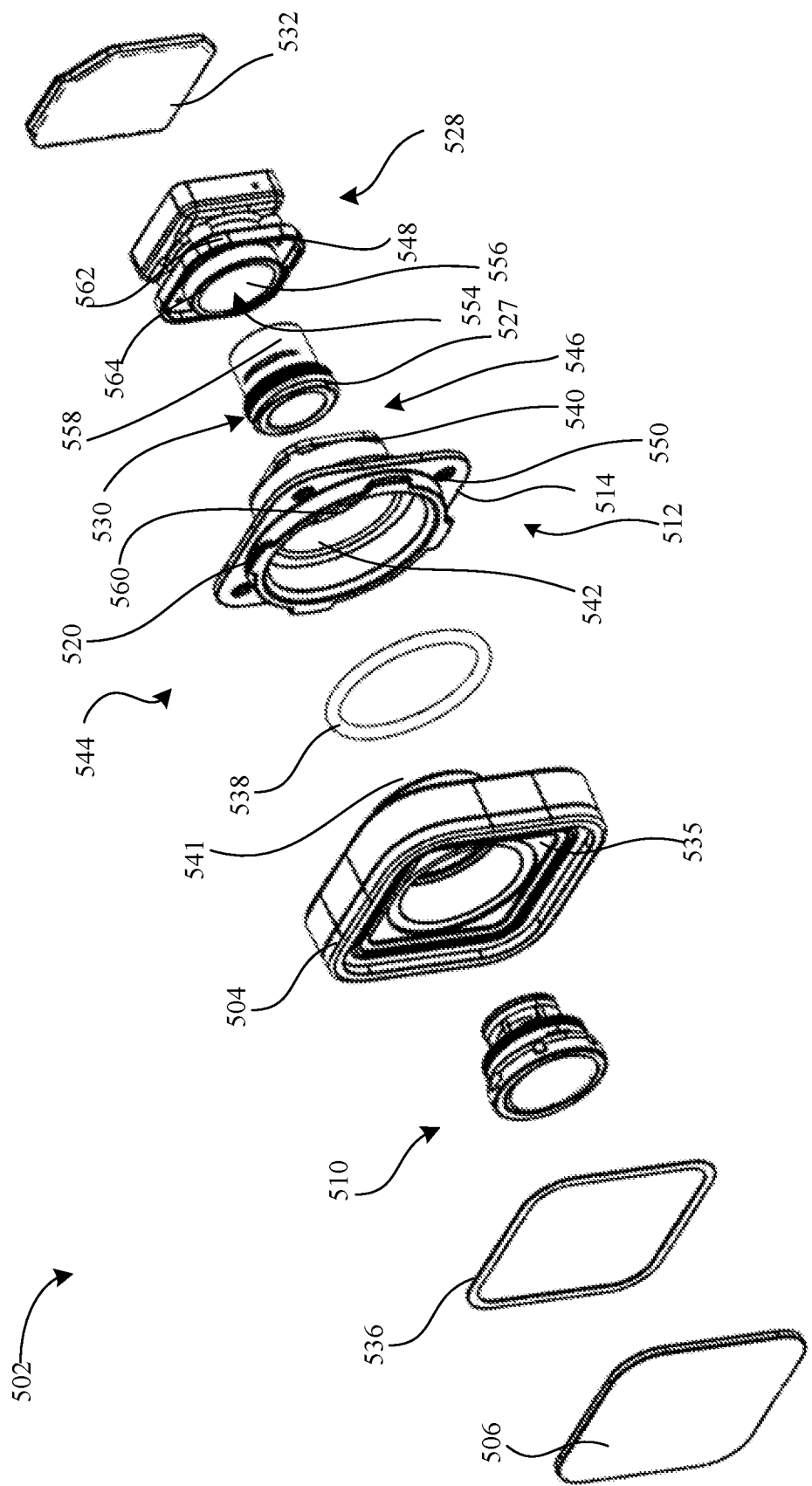
FIG. 5B is an exploded view of the optical system of FIG. 4.

FIGS. 5A-5B illustrate all of the components of an optical system 502 similar to the optical system 402 and the relationship of the components relative to each other. FIG. 5A is a cross-sectional view of FIG. 4 along line VA-VA so that internal components and corresponding relationships of the internal components within the optical system 502 are visible. The optical system 502, a lens module 504, and a lens 506 are located at a forward end 508 of the optical system 502. The lens module 504 protects the forward end 508 of the optical system 502 from impact, fluids, debris, or a combination thereof. The lens module 504 is removable from the front end 508 of the optical system 502 so that a portion of the optical system 502 may be removed, cleaned, changed, or a combination thereof. The lens module 504 is spaced along an axis 524 with respect to, a modular lens 510 of the optical system 502. The lens module 504 and the modular lens 510 are removable from the optical system 502 so that different modular lenses (not shown) may be installed. The lens module 504 is directly connected with the modular lens 510 and extends over the modular lens 510 such that the lens module 504 is removable with the modular lens 510. However, the lens module 504 and the modular lens 510 may be separately removable and replaceable. For example, the lens module 504 may be removed exposing the modular lens 510 and then the modular lens 510 removed. The lens module 504 and the modular lens 510 may be connected within the image capture device via a bayonet 512 or an internal connection within the lens module 504.

The bayonet 512 has a mounting flange 514 that connects the bayonet 512 to the image capture device. The mounting flange 514 includes a forward surface 516 and a rearward surface 518. The mounting flange 514 may extend outward around the bayonet 512, for example, radially with respect to the axis 524. The mounting flange 514 may be an annular extension, arms that extend outward, ledges, extensions, or a combination thereof that connect the bayonet 512 to an image capture device such as the image capture devices 100, 200 of FIGS. 1A and 2A-2B. The mounting flange 514 receives fasteners (not shown) that fixedly connect the bayonet 512 to a surface of the image capture device. The mounting flange 514 may connect the bayonet 512 via any device that is removable from the image capture device. The mounting flange 514 may be permanently connected to the image capture device. The mounting flange 514 may be connected by a fastener such as a screw, a bolt, a threaded connection, adhesive, welding, heat staking, friction welding, a rivet, an interference fit, or a combination thereof. The bayonet 512 includes fingers 520 that are located forward of the mounting flange 514 that assist in connecting the lens module 504 to the bayonet 512.

The fingers 520 may be a male portion that extends into a female portion of a lens module 504 to form a connection or vice versa. The fingers 520 may be snap locks, twist locks, an interference fit, sliding locks, axially receive the lens module 504 and then rotationally lock with the fingers 520 of the bayonet 512, or a combination thereof. The fingers 520 may be intermittently spaced apart around a perimeter of the bayonet 512. The fingers 520 may extend substantially parallel to the mounting flange 514. The fingers 520 may extend outward from the bayonet 512 on an outside of the bayonet 512. The fingers 520 may extend outward from a central portion 522 of the bayonet 512.

The central portion 522 may be located on an inside of the bayonet 512 or may form an interior of the bayonet 512. The central portion 522 is a recess in the bayonet 512 that receives all or a portion of the modular lens 510. The central portion 522 may be a void in the bayonet that receives a rear end of the modular lens 510, a portion of the lens module 504, or both so that the modular lens 510, a portion of the lens module 504, or both are removably housed within the central portion 522, the lens module 504, or both. The central portion 522 of the bayonet 512 may align the modular lens 510 and the lens module 504 along the axis 524 by the modular lens 510 contacting a surface inside the central portion 522. The central portion 522 may be one or more concentric regions (e.g., circles) of the bayonet 512 that are concentric about the axis 524.

A surface within the central portion 522 may align the modular lens 510 while the mounting flange 514 aligns the bayonet 512 relative to the image capture device. The central portion 522 may receive a portion of the lens module 504 and the portion of the lens module 504 may removably connect the lens module 504 to the modular lens 510. A connector 526 within the central portion 522 of the lens module 504 forms a connection with a lens connector 527 of the modular lens 510.

The connector 526 of the lens module 504 may fix the modular lens 510 relative to the axis 524. The connector 526 may connect to a rear end, a forward end, or a location between the rear end and the forward end of the modular lens 510 to the lens module 504 so that the modular lens 510 extends forward from the connector 526 and the modular lens 510 is maintained axially forward of an ISLA 528 with respect to the axis 524. The connector 526, the lens connector 527, or both may include a threaded connection, a press fit connection, an interference fit connection, a detent connection, or a combination thereof.

The ISLA 528 and the modular lens 510 may be axially decoupled. That is, the ISLA 528 and the modular lens 510 are not in direct contact such that there is a gap G therebetween. The ISLA 528, the modular lens 510, the lens module 504, or a combination thereof may be aligned along the axis 524 by the bayonet 512. The ISLA 528 may be fixed within the optical system 502. The ISLA 528 may connect to a rear of the bayonet 512. The ISLA 528 may be free of a connection with the bayonet 512. The ISLA 528 may be a rear portion of a split lens and the modular lens 510 may be a forward portion of the split lens. The ISLA 528 includes one or more lenses 530.

The lenses 530 may be spaced and aligned along the axis 524. The lenses 530 may be one or more lenses, two or more lenses, three or more lenses, or four or more lenses. The lenses 530 may be fixed lenses (e.g., not changeable). The lenses 530 may provide predetermined optics to the image capture device. The lenses 530 of the ISLA 528 may provide optics that may be changed by changing the modular lens 510 so that a user may adjust the optics based upon the optics desired by a user. The lenses 530 may be plano-convex, plano-concave, bi-convex, bi-concave, positive meniscus, negative meniscus, convex, concave, flat, magnifying, filtered, tinted, or a combination thereof. The lenses 530 of the lens assembly 531 may be located axially in front of an integrated sensor 532 with respect to the axis 524.

The integrated sensor 532 has a rear end 534 and is located on and forms a rear end of the optical system 502. The integrated sensor 532 is aligned along the axis 524 with the lens assembly 531, the modular lens 510, and the lens module 504 such that the axis 524 is also an optical axis. The integrated sensor 532 detects images or videos focused along the axis 524. The integrated sensor 532 is or includes an image sensor. The integrated sensor 532 may include memory, motors, a processor, or a combination thereof. The integrated sensor 532 may be connected to a rear end of the lens assembly 531. The integrated sensor 532 may be free of a connection to a body, a heat sink, or other components the image capture device. The integrated sensor 532 may be directly connected to the lens assembly 531 to form a connection within the image capture device. The integrated sensor 532 and the optical system 502 are enclosed by a series of seals (not shown) so that the integrated sensor 532 and the optical system 502 are protected from fluids.

The forward end 508 of the optical system 502 includes a lens recess 535 with a lens seal 536 that sealingly engages with the lens 506 so that fluid is prevented from extending around the lens 506. A bayonet seal 538 is located axially behind the lens seal 536. The bayonet seal 538 is located between the lens module 504 and the bayonet 512.

An ISLA seal 540 is located axially behind the bayonet seal 538 between the bayonet 512 and the ISLA 528. The ISLA seal 540 may create a gap G' that is substantially equal in size to the ISLA seal 540 or a compressed ISLA seal 540. The ISLA seal 540 may decouple the bayonet 512 and the ISLA 528 by forming a barrier therebetween. The bayonet seal 538 may be fully or partially compressed when the lens module 504 is in an installed position on the bayonet 512 as is illustrated in FIG. 5A.

As the lens module 504 is connected to the bayonet 512 by a lens module axial alignment surface 541 contacting a bayonet axial surface 542. An outside of the lens module axial alignment surface 541 contacts and interior of the bayonet axial surface 542 so that the lens module 504 and the bayonet 512 are maintained co-axial with one another.

Each of the seals 536, 538, 540 may have one or more of the following characteristics: an annular shape, compressibility, or elasticity. The seals 536, 538, 540 may be made of or include rubber, an elastomer, a polymer, an oil proof material, a hydrophobic material, an adhesive, or a combination thereof. The seals 536, 538, 540 may be compressed between two components such that when the seals 536, 538, 540 are compressed water is prevented from passing the seals 536, 538, 540. The seals 536, 538, 540 may elastically deform a sufficient amount such that when one component is removed, the seals 536, 538, 540 return substantially back to an original shape and size so that when a subsequent component is installed the seals 536, 538, 540 may be deformed to provide water prevention. The seals 536, 538, 540 may assist in creating a water tight seal so that the lens 506 is removable and replaceable from the lens module 504; the lens module 504 is removable and replaceable from the bayonet 512; the bayonet 512 is removable and replaceable from the ISLA 528; or a combination thereof and a water tight seal may be recreated by reinstalling a removed component or an equivalent thereof.

FIG. 5B is an exploded view of the optical system 502 of FIG. 5A. A forward most end of the optical system 502 includes the lens 506 located in the lens module 504. The lens module 504 includes the lens recess 535 that houses the lens 506. A lens seal 536 is located within the lens recess 535 between the lens 506 and the lens module 504. The lens seal 536 prevents leaks into or through the lens 506 and lens module 504. The lens seal 536 may allow for some thermal expansion, movement, impact resistance, or a combination thereof of the lens 506, the lens module 504, or both. The lens 506 and the lens module 504 may connect to a front of the bayonet 512 over the modular lens 510 and may prevent leakage of the lens module 504.

The bayonet 512 connects to an image capture device such as the image capture devices 100, 200 of FIGS. 1A-2C. The bayonet 512 includes the fingers 520 that extend outward from the bayonet 512 substantially parallel to the mounting flange 514. The fingers 520 are capable of forming a connection with the lens module 504 so that the lens module 504 is connected to the image capture device. The fingers 520 and the mounting flange 514 are located at a forward end 544 of the bayonet 512, and the ISLA seal 540 is located at a rearward end 546 of the bayonet 512.

The ISLA seal 540 extends between the bayonet 512 and the ISLA 528 so that a seal is formed when the bayonet 512 is connected to the ISLA 528. The ISLA seal 540 contacts a shoulder 548 of the ISLA 528 and forms a seal around the modular lens 510. The ISLA seal 540 forms a watertight seal between the ISLA 528 and the bayonet 512 so that the modular lens 510 may be removed and replaced without any sealing being affected.

The bayonet 512 includes a mounting flange 514 including fastener recesses 550 that receive fasteners (not shown) to connect the bayonet 512 to the image capture device. The fastener recesses 550 extend between a forward surface 516 and a rearward surface 518 (e.g., see FIG. 5A) so that the fasteners (not shown) can extend all of the way through the mounting flange 514 into the image capture device.

The lens module 504 includes the lens module axial surface 541 that contacts the bayonet axial surface 542 in the bayonet 512 to assist in installation and removal. The lens module axial surface 541 may be an outer surface of the lens module 504. The lens module axial surface 541 may be substantially smooth, tapered, threaded, contoured, stepped, round, oval, square, a cylinder, or a combination thereof. The lens module axial surface 541 and the bayonet axial surface 542 may have a same shape. The bayonet axial surface 542 may have a similar or same contour, shape, or both as the lens module axial surface 541 so that when the modular lens 510 is in an installed position, the modular lens 510 is fully seated and oriented along the axis 524 (e.g., see FIG. 5A).

The lens module axial surface 541 and the bayonet axial surface 542 assist in aligning the modular lens 510 relative to the bayonet 512. The bayonet axial surface 542 may be an annular surface that is configured to receive and/or contact the lens module axial surface 541 or a portion of the modular lens 510. A size and shape of the lens module axial surface 541 may be substantially identical to an interior of the modular lens 510 so that as the modular lens 510 is inserted into or removed from the bayonet 512, the lens module axial surface 541 contacts the bayonet axial surface 542 to maintain a concentric relationship therebetween. The lens module axial alignment surface 541 may contact the bayonet 512 to align the modular lens 510 relative to the bayonet 5102. The bayonet axial surface 542 may include a connector 526 (e.g., see FIG. 5A) that connects to the bayonet 512, the modular lens 510, or both when lens module 504 is extended into the central portion 522 of the bayonet 512. The bayonet axial surface 542 may prevent the modular lens 510 from being installed in a manner that is offset from the axis 524 so that as the modular lens 510 is installed, the modular lens 510 is aligned with one or more ISLA recess(es) 554 and the lens(es) 530. The lens(es) 530 are located within the ISLA recess(es) 554 adjacent to the lens module 504.

The ISLA recess(es) 554 receive and align the lens(es) 530 so that the integrated sensor 532 is aligned along the axis 524 (e.g., see FIG. 5A) through the lens(es) 530, the ISLA 528, the modular lens 510, and the lens module 504. The ISLA recess(es) 554 may receive all or a portion of the lens(es) 530 so that the lens(es) 530 are aligned within the ISLA 528. The ISLA recess(es) 554 include an inner alignment surface 556 that assists in aligning the lens(es) 530 within the ISLA 528.

The inner alignment surface 556 contacts a lens axial surface 558 of the modular lens 510 so that the lens(es) 530 are aligned within the ISLA 528. The inner alignment surface 556 may contact an outer edge or periphery of the lens(es) 530 so that a center portion of the lens(es) 530 is free of obstruction along the axis 524. The inner alignment surface 556 and the lens axial surface 558 are shaped and sized substantially similarly so that the lens(es) 530 are coaxial. The inner alignment surface 556 may hold the lens(es) 530 via friction, an elastomeric piece, or both. The bayonet 512 includes a bayonet axial alignment surface (BAAS) 560 that assists in aligning the bayonet 512 with the lens(es) 530 using the inner alignment surface 556 of the ISLA recess(es) 554.

The BAAS 560 includes an outer periphery that is contacted by an ISLA axial alignment surface (IAAS) 562 as the bayonet 512 and ISLA 528 are moved relative to one another. The BAAS 560 is a wall or surface of the bayonet 512 that has a fixed shape and size. The IAAS 562 contacts the BAAS 560 so that the wall or surface of the BAAS 560 aligns the IAAS 562 relative to the BAAS 560. The IAAS 562 and the BAAS 560 are complementary in shape and size so that the ISLA recess(es) 554 and the bayonet 512 are aligned relative to one another during movement of the bayonet 512 relative to the ISLA 528. The IAAS 562 and the BAAS 560 each have an axial length parallel to the axis 524 that orients the bayonet 512 and ISLA 528 relative to one another.

The axial length of both the BAAS 560 and the IAAS 562 are sufficiently long so that once the BAAS 560 and the IAAS 562 are in the installed position, the bayonet 512 and the ISLA 528 are aligned about the axis 524 to support image and video detection and capture. All or a portion of the BAAS 560 may extend around the IAAS 562 in an installed position. The IAAS 562, the BAAS 560, or both may have an axial length of about 1 mm or more, about 2 mm or more, about 5 mm or more, about 7 mm or more, about 5 cm or less, about 3 cm or less, or about 1 cm or less. The axial length of the bayonet 512 and the ISLA 528 are sufficiently long so that the bayonet 512 and the ISLA 528 are supported along the axis 524 and have a center that is coaxial with the axis 524 (e.g., see FIG. 5A). The BAAS 560 of the bayonet 512 moves along the IAAS 562 until the rearward end 546 of the BAAS 560 contacts a shoulder 548 of the ISLA 528. The IAAS 562 when installed is located between the BAAS 560 and a retainer 564 of the ISLA 528 and is in contact with the shoulder 548 (e.g., directly or indirectly).

The retainer 564 extends outward from the ISLA 528 in a direction parallel to the BAAS 560. The BAAS 560 is located on an inner periphery (e.g., a first side or an inside) of the ISLA 528 while the retainer 564 is located on an outer periphery (e.g., a second side or an outside) with the shoulder 548 located therebetween. The retainer 564 may be free of contact with the bayonet 512 when the bayonet 512 is in an installed position. The retainer 564 assists in guiding the BAAS 560 into an installed position, onto the IAAS 562, or both. The retainer 564 forms an outer periphery of the ISLA 528 that assists in seating the bayonet 512 relative to the shoulder 548.

Figure 6A:
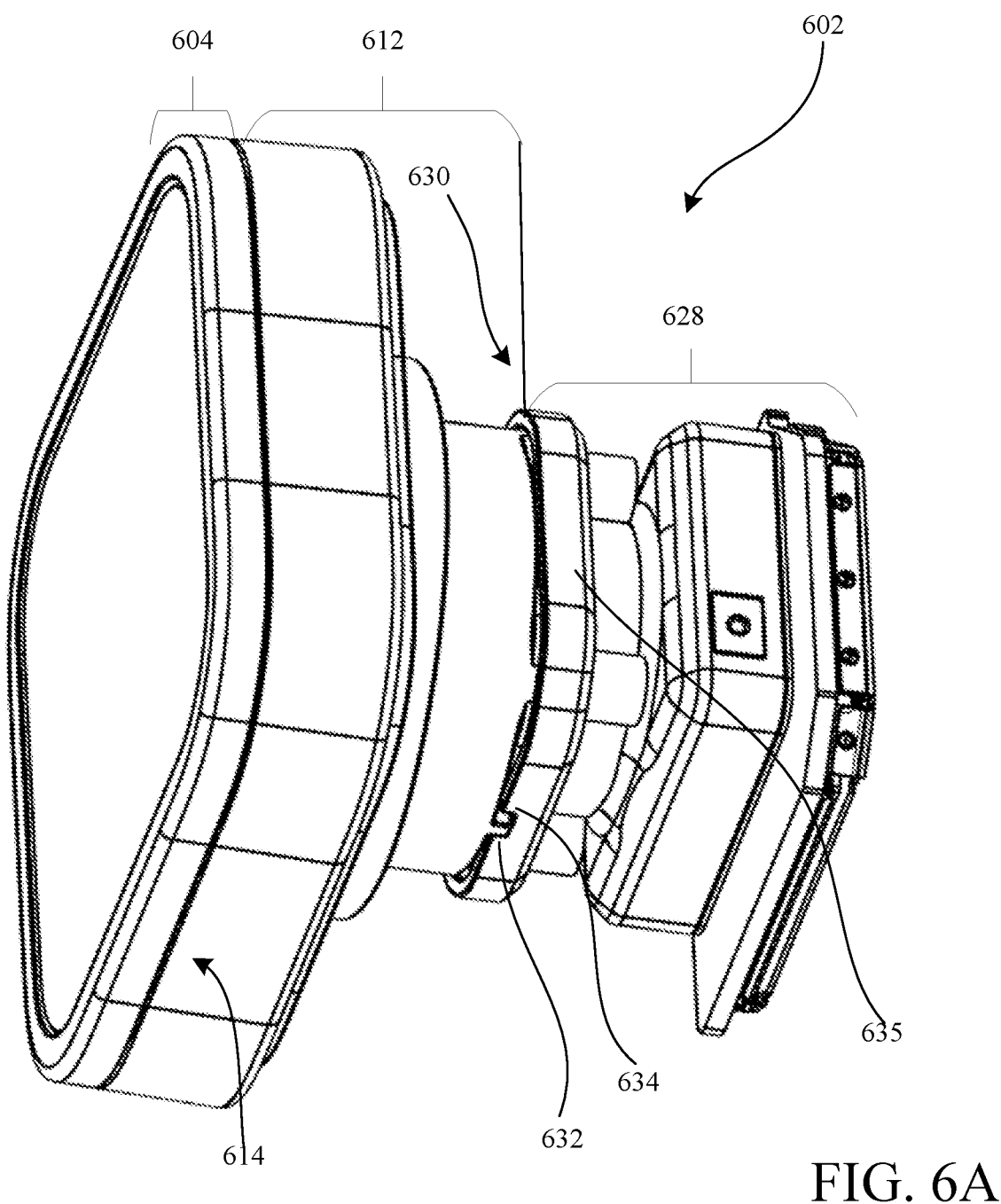
FIG. 6A is a bottom isometric view of the optical system of FIG. 4.

FIG. 6A is a side perspective view of an optical system 602 similar to the optical system 502 of FIGS. 5A and 5B. The optical system 602 includes a lens module 604 connected to a bayonet 612 on a first side 614 of the bayonet 612. The bayonet 612 is connected to a lens mount 620 of an ISLA 628 on a second side 630. The bayonet 612 includes a bayonet tab 632 at the second side 630 that extends into a slot 634 in the ISLA 628. However, the slot 634 may be on the bayonet 612 and the bayonet tab 632 may be on the lens mount 620. The bayonet tab 632 and the slot 634 may be complementary to one another. The bayonet tab 632 and the slot 634 may prevent rotation of the bayonet 612 and the lens mount 620 relative to one another. For example, the bayonet tab 632 and the slot 634 may prevent the bayonet 612 and/or the lens mount 620 from rotating clockwise or counterclockwise about an axis similar to the axis 524 shown in FIG. 5A. The bayonet tab 632 may prevent seating of the bayonet 612 on the lens mount 620 unless the bayonet tab 632 is aligned with the slot 634.

The bayonet tab 632 may be a projection that extends outward from the bayonet 612, keyed to a slot, a square, a rectangle, a triangle, located on a bottom, located on a top, located on a side, or a combination thereof. The bayonet 612 may include one or more, two or more, or three or more of the bayonet tabs 632. The bayonet tabs 632 may provide rotational alignment relative to the lens mount 620 when the bayonet tabs 632 and the slot 634 are in communication.

The slot 634 may be a female part of the lens mount 620, keyed to a bayonet tab 632, a square, a rectangle, a triangle, located on a bottom, located on a top, located on a side, or a combination thereof. There may be an equal number of bayonet tabs 632 and slots 634. Each of the slots 634 may receive a bayonet tab 632 to precisely rotationally (e.g., in a circumferential direction) align the bayonet 612 relative to the ISLA 628. For example, if the bayonet 612 is rotated clockwise, the bayonet 612 is properly aligned when the bayonet tab 632 seats in the slot 634. The slot 634 may be a recess or void in a retainer 635.

The retainer 635 is an outer periphery that receives all or a portion of the bayonet 612. The retainer 635 may provide an outer periphery so that the bayonet 612 and the lens mount 620 of the ISLA 628 are aligned relative to one another.

Figure 6B:
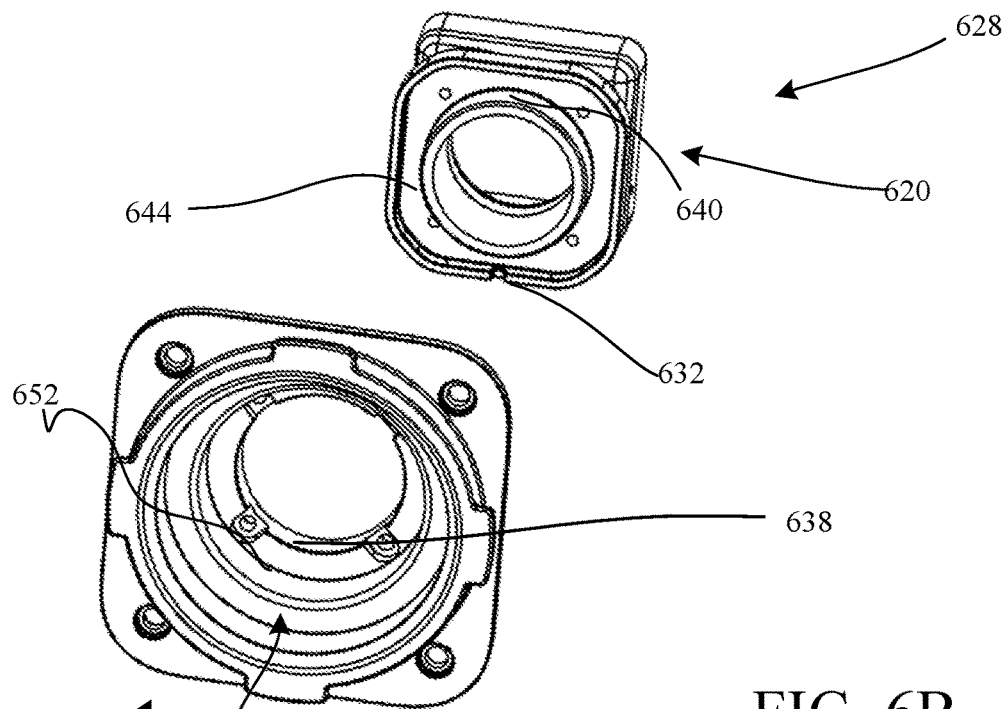
FIG. 6B is a partially exploded view of the optical system showing the lens mount of the ISLA and the bayonet of FIG. 6A.
Figure 6C:
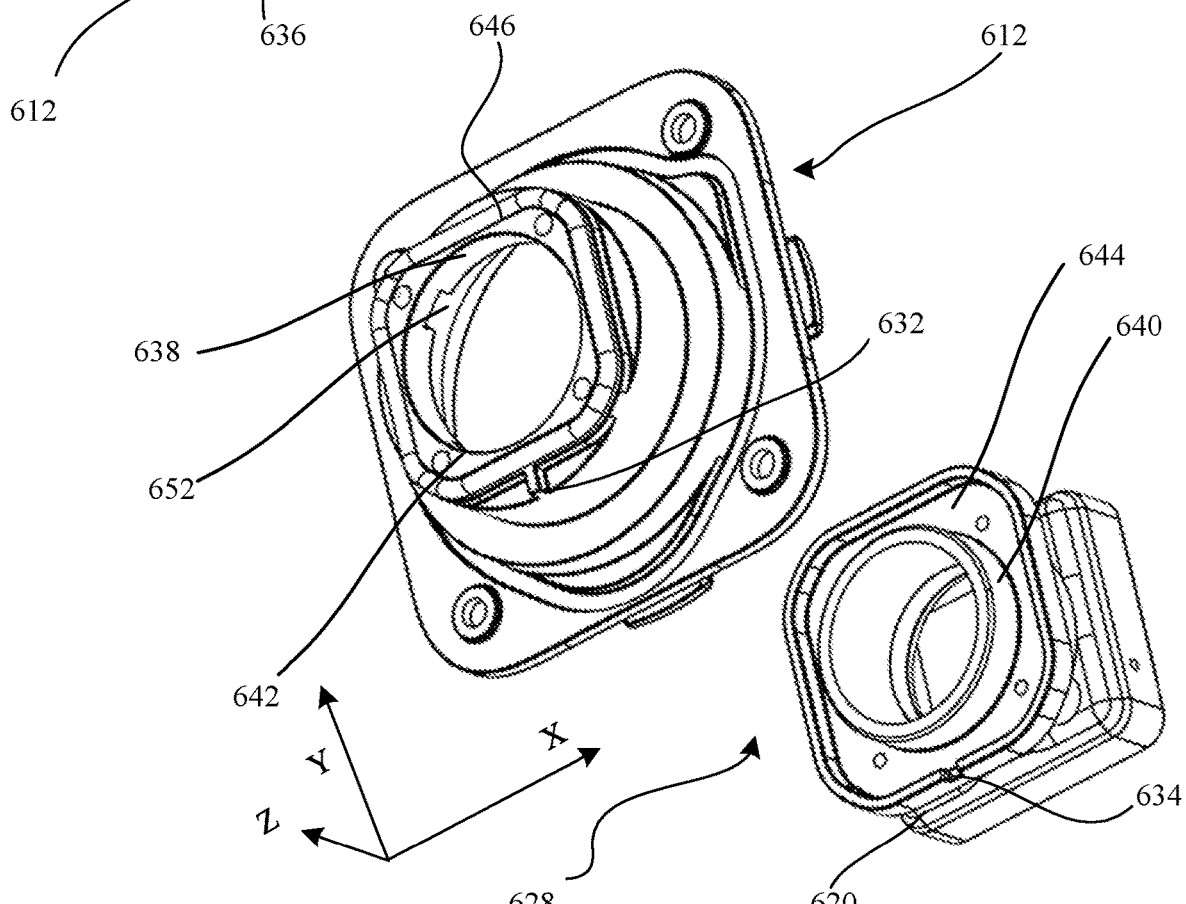
FIG. 6C is an isometric view of the bayonet and the lens mount of the ISLA of FIG. 6B showing a rear view of the bayonet.

FIGS. 6B and 6C illustrate alignment features that align the bayonet 612 and the lens mount 620 of the ISLA 628 relative to one another with FIG. 6B showing a front side and FIG. 6C showing a rear side of the bayonet 612 and the lens mount 620. The bayonet 612 includes a central portion 636 with a bayonet axial alignment surface (BAAS) 638 located on an interior of the central portion 636. The lens mount 620 of the ISLA 628 includes an ISLA axial alignment surface (IAAS) 640 that extends into the central portion 636 and contacts the BAAS 638. The BAAS 638 and the IAAS 640 are concentric so that as the IAAS 640 extends into the central portion 636, the contact aligns the bayonet 612 relative to the lens mount 620 of the ISLA 628. The BAAS 638 and the IAAS 640 may be complementary is size and shape so that the BAAS 638 and the IAAS 640 are aligned within a plane (e.g., within an X/Y plane). The bayonet 612 extends along the IAAS 640 until a planar mating surface 642 of the bayonet 612 contacts a shoulder 644 of the lens mount 620.

The planar mating surface 642 and shoulder 644 may extend in an X/Y plane, the X, Y, and Z directions being indicated in FIG. 6C. The planar mating surface 642 and the shoulder 644 may align or orient the bayonet 612 relative to the lens mount 620 of the ISLA 628 in an axial direction or a Z direction relative to the X/Y plane. The planar mating surface 642 may extend parallel to the shoulder 644. The planar mating surface 642 and the shoulder 644 may extend in the X/Y plane and may align the bayonet 612 and the lens mount 620 of the ISLA 628 in the Z direction. The planar mating surface 642 and the shoulder 644 may be connected together by fasteners (not shown) extending through the planar mating surface 642 into the shoulder 644. A thickness of the planar mating surface 642 may determine axial spacing of the bayonet 612 relative to the lens mount 620. The planar mating surface 642 and shoulder 644 may create a predetermined space between the bayonet 612 and the lens mount 620. The planar mating surface 642 and the shoulder 644 may be spaced apart by an ISLA seal 646.

The ISLA seal 646 may prevent fluid from extending between the bayonet 612 and the ISLA 628. The ISLA seal 646 may decouple the bayonet 612 and the ISLA 628 so that the gap G of FIG. 6A is formed between the bayonet 612 and the lens mount 620. The size or thickness of the ISLA seal 646, the planar mating surface 642, or both may determine an amount or a size of the gap G between the bayonet 612 and the lens mount 620 of the ISLA 628. The ISLA seal 646 may be made of or include rubber, an elastomer, silicone, or a combination thereof. The ISLA seal 646 may be deformable, elastically deformable, compressible, or a combination thereof. The ISLA seal 646 may be sufficiently thin so that the bayonet tab 632 can extend into the slot 634 and form the installed position.

The planar mating surface 642 and the shoulder 644 may only contact one another (e.g., directly or indirectly) when the bayonet tab 632 is located within the slot 634. The bayonet tab 632 and the slot 634 may prevent the bayonet 612 from rotating relative to the lens mount 620 about the optical axis (not shown) (e.g., about the Z-direction). When the bayonet 612 and the ISLA 628 are aligned, a bayonet axial surface 652 of the bayonet 612 is aligned along an optical axis (not shown).

Figure 7A:
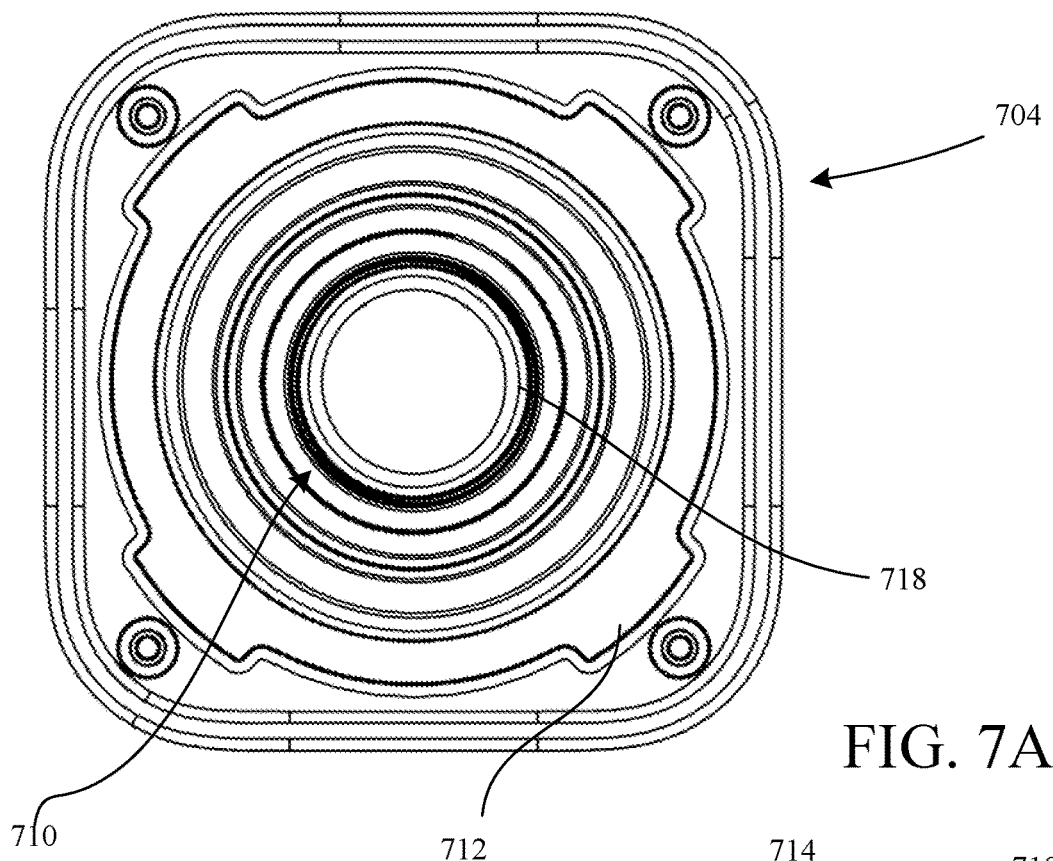
FIG. 7A is a front view of the lens module within a modular lens.
Figure 7B:
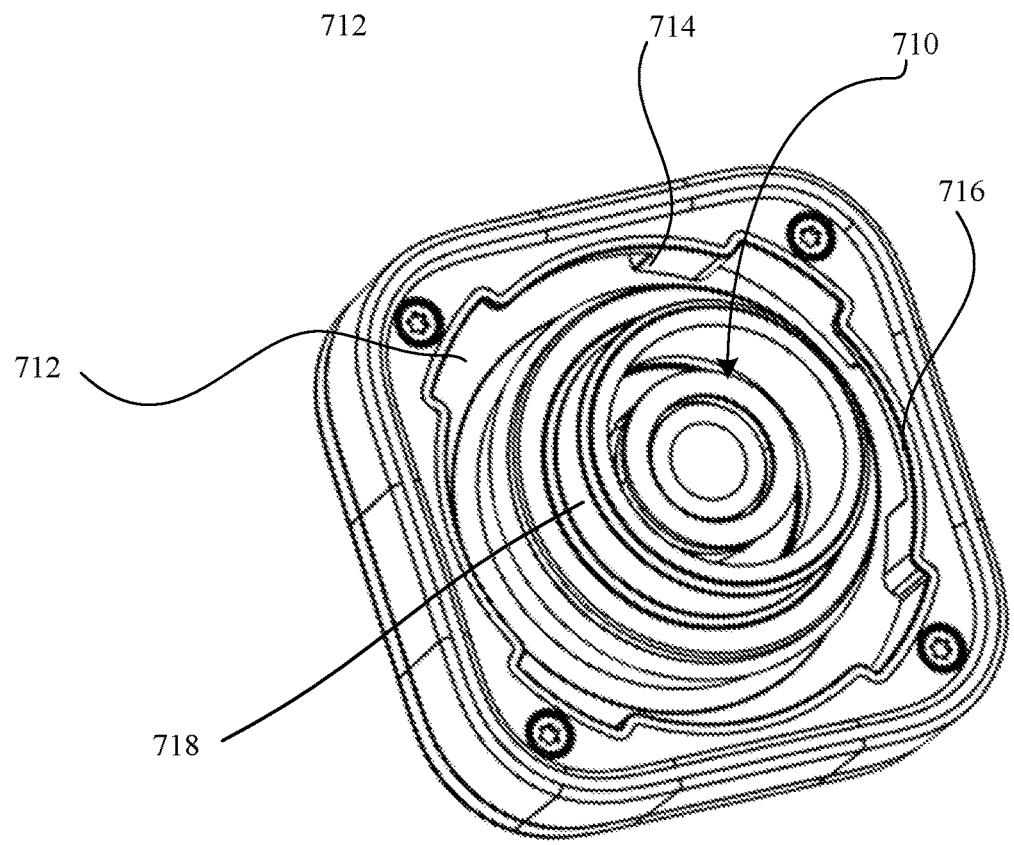
FIG. 7B is a rear isometric view of the lens module and modular lens of FIG. 7A.

The bayonet axial surface 652 aligns all or a portion of a modular lens (e.g., the modular lens 510 of FIG. 5A and the modular lens 710 of FIG. 7B). The bayonet axial surface 652 may be concentric with or radially spaced apart from the BAAS 638, the IAAS 640, or both.

FIGS. 7A and 7B illustrate a lens module 704 and a modular lens 710. FIG. 7A is a front view of the lens module 704 with the modular lens 710 located therein. The lens module 704 includes finger recesses 712 configured to receive fingers (e.g., the fingers 520 of FIG. 5A) of a bayonet (e.g., the bayonet 512 of FIG. 5A) so that the lens module 704 is connectable to the bayonet. As the lens module 704 is rotated relative to the bayonet 512, the fingers 520 rotate toward a recess stop 714. The finger recesses 712 include a taper 716 so that the lens module 704 is compressed and locked on the fingers 520 based on rotational force application.

The recess stop 714 allows movement of the fingers a predetermined distance but no movement of the finger beyond the recess stop 714. The recess stop 714 allows for rotation of the lens module 704 relative to the bayonet a predetermined distance. The recess stop 714 may stop movement of the fingers when the fingers achieve a locked position. The recess stop 714 may be a wall (e.g., a flat wall) that prevents further rotational movement of the lens module 704. The lens module 704 may include one or more, two or more, three or more, or even four or more recess stops 714. The lens module 704 may be divided into four quadrants and each quadrant may include a recess stop 714. Each recess stop 714 may be located at an end of a taper 716.

The taper 716 is configured to assist in moving the lens module 704 relative to a bayonet (not shown), lock the lens module 704, assist in creating a water tight seal, compress a bayonet seal (e.g., the bayonet seal 538 of FIGS. 5A-5B), or a combination thereof. The taper 716 may be an increase in thickness of material of the lens module 704 within the finger recess 712 so that the lens module 704 is moved along the axis (e.g., in a z-direction) as the lens module 704 is rotated (e.g., within the X/Y plane shown in FIG. 6C). The taper 716 may compress the lens seal (e.g., the bayonet seal 538 of FIGS. 5A-5B) between the lens module 704 and the bayonet (e.g., the bayonets 512, 612 of FIGS. 5A-5B, 6A-6C). All or a portion of the modular lens 710 may axially extend into or through the lens module 704 when the lens module 704 is in a connected state (e.g., an installed state).

The lens module 704 includes a lens module axial surface 718 that assists in aligning the lens module 704 and the modular lens 710 with the bayonet so that the lens module 704 and modular lens 710 are connected to the image capture device such as the image capture devices 100, 200 of FIGS. 1A and 2A-2B. The lens module axial surface 718 is configured to align the lens module 704 along an optical axis into a central portion of a bayonet (e.g., the central portion 522 of FIG. 5A). The lens module axial surface 718 is located on an outer surface of the lens module 704 and may align the lens module 704 relative to a bayonet axial surface (e.g., the bayonet axial surface 542 of FIG. 5B). The lens module axial surface 718 may contact the bayonet axial surface during insertion or removal so that the lens module 704 moves along the optical axis or vice versa. The lens module axial surface 718 may assist in ensuring proper alignment of the lens module 704 and the bayonet when the lens module 704 and modular lens 710 are installed.

The lens module axial surface 718 may have a cylindrical shape or a cylindrical projection that extends into the bayonet. The lens module axial surface 718 may have a cross-section that is stepped (e.g., with cross-sectional thickness changes), smooth, continuous, concentric, of a constant cross-sectional length (e.g., diameter), of a constant shape, of a changing cross-sectional length, of a changing shape, or a combination thereof. A size and shape of the lens module axial surface 718 may substantially mirror a size and shape of the bayonet axial surface. The lens module axial surface 718 may surround one or more lenses (e.g., the lenses in the modular lens 510 see FIG. 5A). The lens module axial surface 718 may be an outer surface of the lens module 704. The lens module axial surface 718 may have a cross-sectional shape that is cylindrical, square, oval, geometric, non-geometric, symmetrical, asymmetrical, complementary to a shape of the bayonet, or a combination thereof.

The systems of FIGS. 4-7B illustrate various lens modules that are removable from the image capture device. The lens modules described, or different lens modules, may be installed or reinstalled within an image capture device such as the image capture devices 100, 200 of FIGS. 1A to 2D. In order to properly install one of the lens modules to detect and capture images or video, the respective lens module, the bayonet, and the ISLA all need to be aligned along an axis (e.g., co-axial) and be rotationally aligned relative to one another. The lens modules and the bayonets described herein, such as the bayonets 512, 612 of FIGS. 5A-5B, 6A-6C, include alignment surfaces so that the lens modules and the bayonets can be axially aligned relative to one another. The bayonets and the ISLAs, such as the ISLAs 408, 528, 526 of FIGS. 4 to 6C, also include alignment surfaces so that the bayonets and ISLAs can be co-axial with one another. Further, at least some of the ISLAs and the bayonets include respective slots and retainers that rotationally align the ISLAs and the bayonets relative to one another. The alignment surfaces of the bayonets, the ISLAs, and the lens modules reduce the tolerances needed to align these components relative to one another within the image capture device.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device comprising:
   a bayonet connected to a body of the image capture device, wherein the bayonet comprises:
   a forward surface, a rearward surface opposing the forward surface, and
   a bayonet axial surface; and
   an optical system comprising:
   an integrated sensor and lens assembly (ISLA) directly connected to and extending away from the rearward surface of the bayonet, and
   a lens module connected to and extending away from the forward surface of the bayonet and comprising a lens module axial surface, wherein the lens module axial surface directly contacts the bayonet axial surface so that the lens module is axially aligned with the bayonet.

2. The image capture device of claim 1, further comprising:
   an axis, wherein the lens module is movable along the axis to install the lens module within the image capture device or remove the lens module from the image capture device.

3. The image capture device of claim 2, wherein the lens module includes finger recesses that removably connect the lens module to the bayonet.

4. The image capture device of claim 1, wherein the lens module further comprises finger recesses including a taper so that as the lens module is connected to the bayonet, the lens module axially moves toward the bayonet.

5. The image capture device of claim 4, wherein a bayonet seal is located between the lens module and the bayonet, and wherein the bayonet seal is at least partially compressed between the bayonet and the lens module when the lens module is in an installed position relative to the bayonet.

6. The image capture device of claim 1, wherein the bayonet comprises a central portion and the bayonet axial surface is located in an interior of the central portion, and wherein the lens module axial surface is located on an exterior of the lens module so that as the lens module is connected to the bayonet, the lens module axial surface extends into the central portion and into contact with the bayonet axial surface to align the lens module relative to the bayonet along an optical axis of the image capture device.

7. The image capture device of claim 1, wherein the lens module axial surface has a stepped shape.

8. The image capture device of claim 1, wherein the bayonet is recessed so that all or a portion of the modular lens extends into the recess of the bayonet.

9. An image capture device comprising:
   a bayonet connected to a body of the image capture device, wherein the bayonet comprises:
   a forward surface, a rearward surface opposing the forward surface, and
   a bayonet axial alignment surface (BAAS) extending from the forward surface toward the rearward surface about an optical axis; and
   an optical system comprising:
   an integrated sensor and lens assembly (ISLA) comprising an ISLA axial alignment surface (IAAS) configured to contact the BAAS to align the ISLA with the bayonet about the optical axis so that the ISLA connects to and extends away from the rearward surface of the bayonet, and
   a modular lens extending along the optical axis in a direction away from the ISLA and toward the forward surface of the bayonet, wherein all or a portion of the BAAS extends around the IAAS.

10. The image capture device of claim 9, wherein the IAAS extends to a wall of the BAAS.

11. The image capture device of claim 9, wherein the ISLA further comprises a retainer located on the ISLA.

12. The image capture device of claim 11, wherein the ISLA further comprises a shoulder located between the retainer and the IAAS.

13. The image capture device of claim 12, wherein the bayonet further comprises a planar mating surface that contacts the shoulder to orient the bayonet relative to the ISLA.

14. The image capture device of claim 11, wherein the retainer defines a slot configured to receive a bayonet tab of the bayonet to rotationally align the bayonet and the ISLA about the axis extending through the bayonet and the ISLA.

15. An image capture device comprising:
    a bayonet connected to a body of the image capture device, wherein the bayonet comprises:
    a forward surface, a rearward surface,
    a planar mating surface, and
    a bayonet tab; and
    an optical system comprising:
    an integrated sensor and lens assembly (ISLA) connected to and extending away from the rearward surface of the bayonet, wherein the ISLA comprises:
    a shoulder configured to contact the planar mating surface so that the bayonet and the ISLA maintain an axial spacing therebetween along an image axis that extends through the bayonet and the ISLA, and
    a slot configured to receive the bayonet tab so that the ISLA and the bayonet are aligned relative to one another when the bayonet tab and the slot are in communication; and
    a modular lens connected to the bayonet and extending along the image axis in a direction from the rearward surface toward the forward surface of the bayonet.

16. The image capture device of claim 15, further comprising an ISLA axial alignment surface (IAAS) located within an interior of the shoulder and a retainer located on an exterior of the shoulder.

17. The image capture device of claim 16, wherein the axial spacing of the planar mating surface with respect to the ISLA is determined by a thickness of the planar mating surface, an ISLA seal, or both along the image axis.

18. The image capture device of claim 16, wherein the retainer is free of contact with the bayonet when the bayonet is in an installed position.

19. The image capture device of claim 15, further comprising an ISLA seal located between the shoulder and the planar mating surface.

20. The image capture device of claim 15, wherein fasteners extend through the planar mating surface into the shoulder to connect the bayonet to the ISLA.

* * * * *